[12] United States Patent
Ji et al.

(10) Patent No.: US 7,660,067 B1
(45) Date of Patent: Feb. 9, 2010

(54) DISK DRIVE INITIALIZING A COIL TEMPERATURE ESTIMATION ALGORITHM USING A RESISTANCE OF THE COIL ESTIMATED DURING A LOAD OPERATION

(75) Inventors: Chuanwen Ji, Irvine, CA (US); Jianghong Ding, Lake Forest, CA (US); Duc T. Phan, Saratoga, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 68 days.

(21) Appl. No.: 11/857,739

(22) Filed: Sep. 19, 2007

(51) Int. Cl.
*G11B 21/02* (2006.01)
(52) U.S. Cl. .................... 360/75; 318/471; 388/934
(58) Field of Classification Search ............ None
See application file for complete search history.

(56) References Cited

U.S. PATENT DOCUMENTS

| | | | |
|---|---|---|---|
| 5,594,603 A | 1/1997 | Mori et al. | |
| 6,229,663 B1 * | 5/2001 | Yoneda et al. | ............... 360/75 |
| 6,369,972 B1 | 4/2002 | Codilian et al. | |
| 6,661,598 B2 | 12/2003 | Kusumoto et al. | |
| 6,731,450 B1 | 5/2004 | Codilian et al. | |
| 6,791,785 B1 | 9/2004 | Messenger et al. | |
| 6,917,486 B2 | 7/2005 | Tanner | |
| 6,937,427 B2 | 8/2005 | Tan et al. | |
| 7,005,820 B2 * | 2/2006 | Tanner | ..................... 318/471 |
| 7,009,354 B2 | 3/2006 | Tanner | |
| 7,009,806 B2 | 3/2006 | Zayas et al. | |
| 7,042,673 B2 | 5/2006 | Jeong | |
| 7,050,254 B1 | 5/2006 | Yu et al. | |
| 7,082,009 B2 | 7/2006 | Zayas et al. | |
| 2001/0026414 A1 | 10/2001 | Shibata | |
| 2003/0179486 A1 * | 9/2003 | Ho et al. | ....................... 360/71 |
| 2004/0047064 A1 * | 3/2004 | Kusumoto et al. | ............ 360/75 |
| 2007/0247740 A1 * | 10/2007 | Wasa et al. | .................... 360/75 |

* cited by examiner

*Primary Examiner*—Jason C Olson
(74) *Attorney, Agent, or Firm*—Howard H. Sheerin, Esq.

(57) ABSTRACT

A disk drive is disclosed including a disk, a head coupled to a distal end of an actuator arm, and a voice coil motor (VCM) operable to rotate the actuator arm about a pivot to actuate the head radially over the disk, wherein the VCM comprises a coil. Control circuitry within the disk drive measures a load resistance of the coil prior to executing a load operation, wherein the load operation moves the actuator arm off a ramp to load the head onto the disk. The load resistance of the coil is then converted into an initial coil temperature estimate.

19 Claims, 5 Drawing Sheets

DISK DRIVE INITIALIZING A COIL TEMPERATURE ESTIMATION ALGORITHM USING A RESISTANCE OF THE COIL ESTIMATED DURING A LOAD OPERATION

BACKGROUND

1. Field

The present invention relates to disk drives for computer systems. In particular, the present invention relates to a disk drive initializing a coil temperature estimation algorithm using a resistance of the coil estimated during a load operation.

2. Description of the Related Art

Disk drives comprise a disk and a head connected to a distal end of an actuator arm which is rotated about a pivot by a voice coil motor (VCM) to position the head radially over the disk. The disk typically comprises a number of concentric data tracks each partitioned into a number of data sectors. Access operations are performed by seeking the head to a target data track, and performing a write/read operation on the data sectors within the data track. The prior art has suggested to estimate the temperature of the coil and adjust the seek time accordingly to prevent the VCM from overheating, which may cause the material molded over the voice coil to delaminate, lose its rigidity, and/or outgas particles that may contaminate the disk. Overheating the VCM may also degrade the strength of the fixed magnets that interact with the magnetic flux generated by the voice coil.

A temperature sensor (e.g., a thermistor) has been employed to estimate the temperature of the coil, however, since the temperature sensor is not integrated with the coil, there may be significant estimation error. In order to improve the estimate, the prior art has suggested to estimate the coil temperature as a function of the power input into the coil (i.e., as a function of the current applied to the coil and its resistance). The coil temperature is estimated by making adjustments to an initial coil temperature estimate which is determined, for example, with a temperature sensor. However, if the initial coil temperature estimate is inaccurate, it may take time for the coil temperature estimation algorithm to converge, leading to undesirable VCM overheating during the convergence period. In addition, if the coil resistance is estimated from the coil temperature estimate (e.g., prior to executing an unload operation), the error in the resistance estimate may cause the disk drive to malfunction.

There is, therefore, a need to improve the coil temperature estimation algorithm in a disk drive.

SUMMARY OF THE EMBODIMENTS OF THE INVENTION

An embodiment of the present invention comprises a disk drive including a disk, a head coupled to a distal end of an actuator arm, and a voice coil motor (VCM) operable to rotate the actuator arm about a pivot to actuate the head radially over the disk, wherein the VCM comprises a coil. Control circuitry within the disk drive measures a load resistance of the coil prior to executing a load operation, wherein the load operation moves the actuator arm off a ramp to load the head onto the disk. The load resistance of the coil is then converted into an initial coil temperature estimate.

In one embodiment, the control circuitry is further operable to measure a calibrated ambient temperature (Tcal_amb) using a temperature sensor, and measure a calibrated ambient resistance (Rcal_amb) of the coil at the calibrated ambient temperature (Tcal_amb). In one embodiment, the control circuitry measures the calibrated ambient resistance (Rcal_amb) of the coil after the VCM has been idle for a predetermined interval. In another embodiment, the control circuitry is further operable to convert the load resistance of the coil into the initial coil temperature estimate according to:

$$\frac{1}{\alpha}(Rcoil - Rcal\_amb) + Tcal\_amb$$

where α is a coefficient, and Rcoil is the load resistance of the coil. In one embodiment, the control circuitry is further operable to calibrate the coefficient α according to:

$$\frac{Rtemp1 - Rtemp2}{temp1 - temp2}$$

where temp1 is a first ambient temperature, temp2 is a second ambient temperature, Rtemp1 is a measured coil resistance at temp1, and Rtemp2 is a measured coil resistance at temp2.

In yet another embodiment, the control circuitry is further operable to estimate a change in the coil temperature according to:

$$\frac{1}{K_t}(K_r P_r + Tamb - Tcoil)$$

where $K_t$ and $K_r$ are coefficients, $P_r$ is a heating power of the coil, Tamb is an ambient temperature measured with a temperature sensor, and Tcoil is a previous coil temperature estimate. In one embodiment, the heating power of the coil Pr is estimated according to:

$$R_c I_c^2$$

where, $R_c$ is an estimated resistance of the coil, and $I_c$ is a measured current flowing through the coil. In one embodiment, the resistance of the coil $R_c$ is estimated according to:

Rcal_amb[1+α(Tcoil−Tcal_amb)].

In one embodiment, the control circuitry is further operable to convert the coil temperature estimate into an unload resistance of the coil prior to executing an unload operation, and in one embodiment, the control circuitry is further operable to convert the coil temperature estimate into the unload resistance of the coil according to:

Rcal_amb[1+α(Tcoil−Tcal_amb)]

Another embodiment of the present invention comprises a method of operating a disk drive, the disk drive comprising a disk, a head coupled to a distal end of an actuator arm, and a voice coil motor (VCM) operable to rotate the actuator arm about a pivot to actuate the head radially over the disk, wherein the VCM comprises a coil. A load resistance of the coil is measured prior to executing a load operation, wherein the load operation moves the actuator arm off a ramp to load the head onto the disk. The load resistance of the coil is converted into an initial coil temperature estimate.

DETAILED DESCRIPTION OF EMBODIMENTS OF THE INVENTION

Figure 1A:
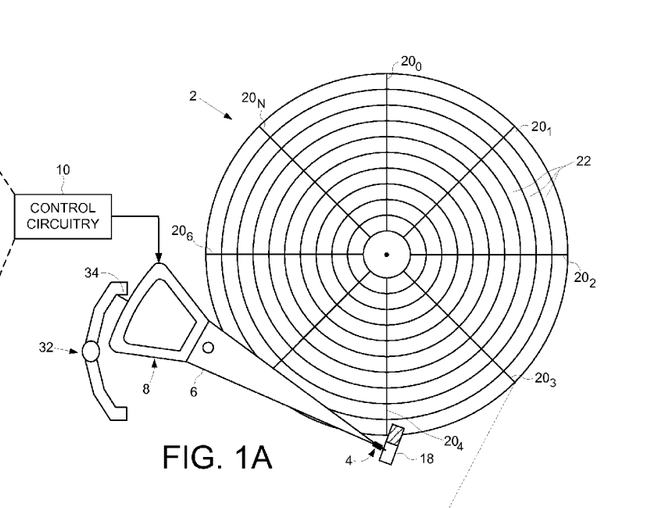
FIG. 1A shows a disk drive according to an embodiment of the present invention comprising a disk, a head connected to a distal end of an actuator arm, a voice coil motor comprising a coil, and a ramp.
Figure 1B:
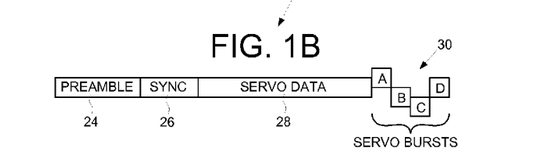
FIG. 1B shows a format of a servo sector according to an embodiment of the present invention.
Figure 1C:
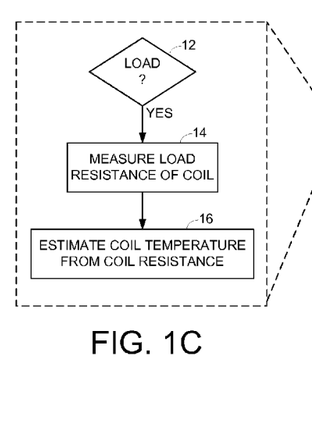
FIG. 1C is a flow diagram according to an embodiment of the present invention for measuring a coil resistance prior to executing a load operation, and converting the measured coil resistance into an initial coil temperature estimate.

FIG. 1A shows a disk drive according to an embodiment of the present invention comprising a disk 2, a head 4 coupled to a distal end of an actuator arm 6, and a voice coil motor (VCM) operable to rotate the actuator arm about a pivot to actuate the head 4 radially over the disk 2, wherein the VCM comprises a coil 8. Control circuitry 10 within the disk drive executes the flow diagram of FIG. 1C according to an embodiment of the present invention, wherein prior to executing a load operation (step 12), the control circuitry measures a load resistance of the coil 8 (step 14), wherein the load operation moves the actuator arm 6 off a ramp 18 to load the head 4 onto the disk 2. The load resistance of the coil 8 is then converted into an initial coil temperature estimate (step 16).

In the embodiment of FIG. 1A, the disk 2 comprises a plurality of servo sectors $20_0$-$20_N$ that define a plurality of data tracks 22. Each servo sector $20_i$ (e.g., servo sector $20_3$ shown in FIG. 1B) may comprise a preamble 24 for storing a periodic pattern, which allows proper gain adjustment and timing synchronization of the read signal, and a sync mark 26 for storing a special pattern used to symbol synchronize to a servo data field 28. The servo data field 28 stores coarse head positioning information, such as a track address, used to position the head 4 over a target data track during a seek operation. Each servo sector $20_i$ further comprises groups of servo bursts 30 (e.g., A, B, C and D bursts), which comprise a number of consecutive transitions recorded at precise intervals and offsets with respect to a data tract centerline. The groups of servo bursts 30 provide fine head position information used for centerline tracking while accessing a data track during write/read operations.

In the embodiment of FIG. 1A, the disk drive further comprises a crash stop 32 having first and second arms that provide motion limits for a tang 34 attached to the base of the actuator arm 6. When the actuator arm 6 is rotated about the pivot in a clockwise direction during an unload operation, a tab extending out of the distal end of the actuator arm 6 contacts and then moves up the ramp 18 until the tang 34 makes contact with the crash stop 32. During a load operation, the actuator arm 6 is rotated about the pivot in a counter clockwise direction so that the head 4 is loaded onto the disk 2.

In one embodiment, the control circuitry 10 measures the load resistance of the coil 8 prior to executing a load operation by applying a torque to the actuator arm 6 to press the tang 34 against the crash stop 32. With the tang 34 pressed against the crash stop, the voltage drop measured across the voice coil 8 together with the amplitude of the current applied to the coil provide an estimate of the load resistance of the coil 8. Any suitable technique may also be employed to improve the estimate of the load coil resistance, such as by estimating the DC offset of the circuitry that measures the voltage drop across the voice coil 8.

Figure 2:
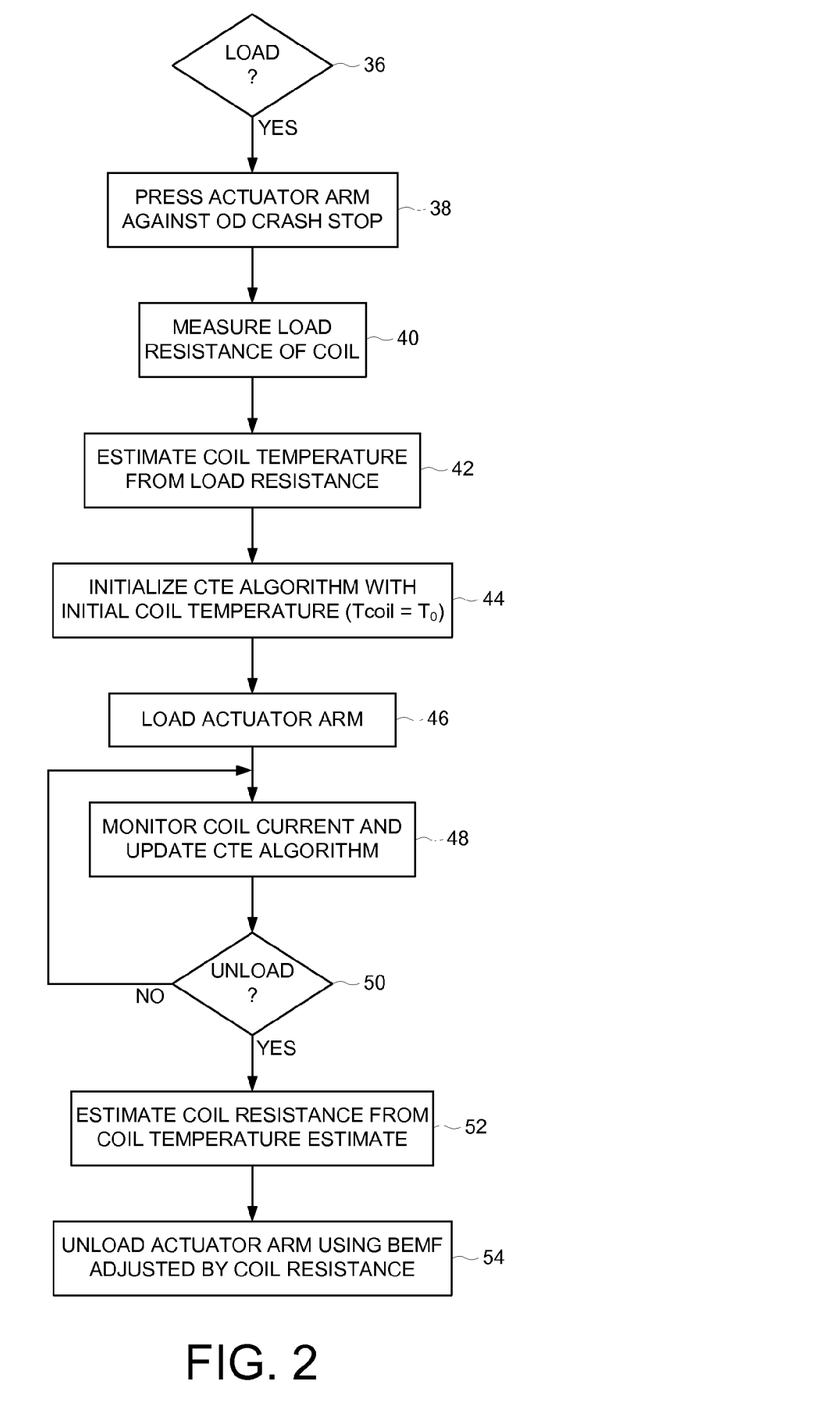
FIG. 2 is a flow diagram according to an embodiment of the present invention wherein the coil temperature estimate is updated and then converted into a coil resistance prior to executing an unload operation.

FIG. 2 is a flow diagram executed by the control circuitry 10 according to an embodiment of the present invention wherein when a load operation is to be executed (step 36) the actuator arm is pressed against the crash stop (step 38) in order to measure the load resistance of the coil (step 40). The temperature of the coil is then estimated in response to the load resistance of the coil (step 42), and a coil temperature estimation (CTE) algorithm is initialized with the estimated coil temperature (step 44). The head is then loaded onto the disk (step 46) and the CTE algorithm is updated by evaluating the current applied to the coil (step 48). That is, the temperature of the coil may be estimated as a function of the initial temperature which is then modified by the change in temperature due to the current applied to the coil (e.g., during seek operations). When an unload operation is to be executed (step 50), an unload coil resistance is estimated from the current coil temperature estimate (step 52). That is, the resistance of the coil varies based on the temperature of the coil, and therefore the coil resistance may be estimated in response to the coil temperature. The actuator arm is unloaded (step 54) in response to the BEMF voltage adjusted by the unload coil resistance (i.e., the contribution of the voltage due to the coil resistance is canceled from the measured voice coil voltage to provide a more accurate estimate of the BEMF voltage).

Figure 3A:
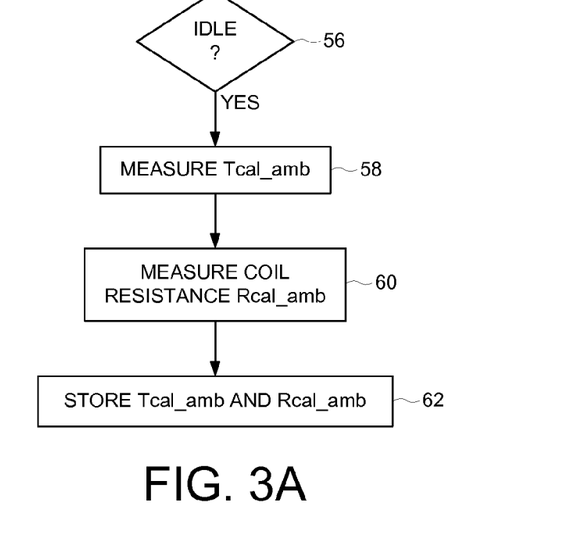
FIG. 3A is a flow diagram according to an embodiment of the present invention for measuring a calibrated coil temperature and a corresponding calibrated coil resistance.

Any suitable technique may be employed to estimate the load coil resistance prior to executing a load operation. FIG. 3A is a flow diagram executed by the control circuitry 10 according to an embodiment of the present invention wherein a calibrated temperature and coil resistance are measured and stored for use in estimating the load coil resistance. The calibration procedure of FIG. 3A is executed after the VCM has been idle (step 56) for enough time to allow the temperature of the coil to settle to an ambient temperature. A calibrated ambient temperature (Tcal_amb) is then measured (step 58) using a suitable temperature sensor, such as a thermistor, and the actuator arm is pressed against a crash stop (outer or inner) in order to measure (step 60) a corresponding calibrated coil resistance (Rcal_amb). The calibrated ambient temperature (Tcal_amb) and the calibrated coil resistance (Rcal_amb) are then stored (step 62) in a suitable memory, such as a FLASH memory.

Figure 3B:
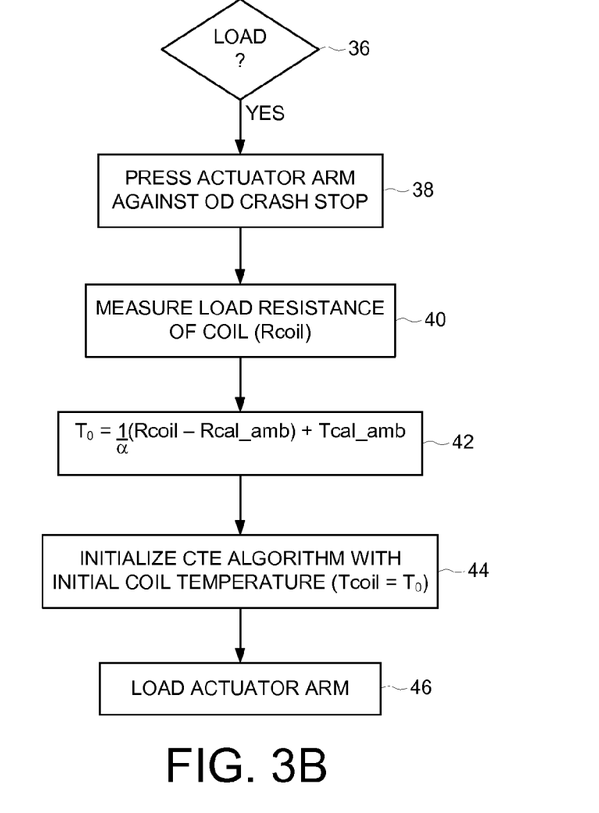
FIG. 3B is a flow diagram according to an embodiment of the present invention including an algorithm for converting the load resistance of the coil into the initial coil temperature estimate.

FIG. 3B is a flow diagram similar to FIG. 2 wherein a particular equation is disclosed (step 42) for estimating the initial coil temperature using the calibrated coil temperature and calibrated coil resistance values according to:

$$\frac{1}{\alpha}(Rcoil - R\text{cal\_amb}) + T\text{cal\_amb}$$

Figure 4:
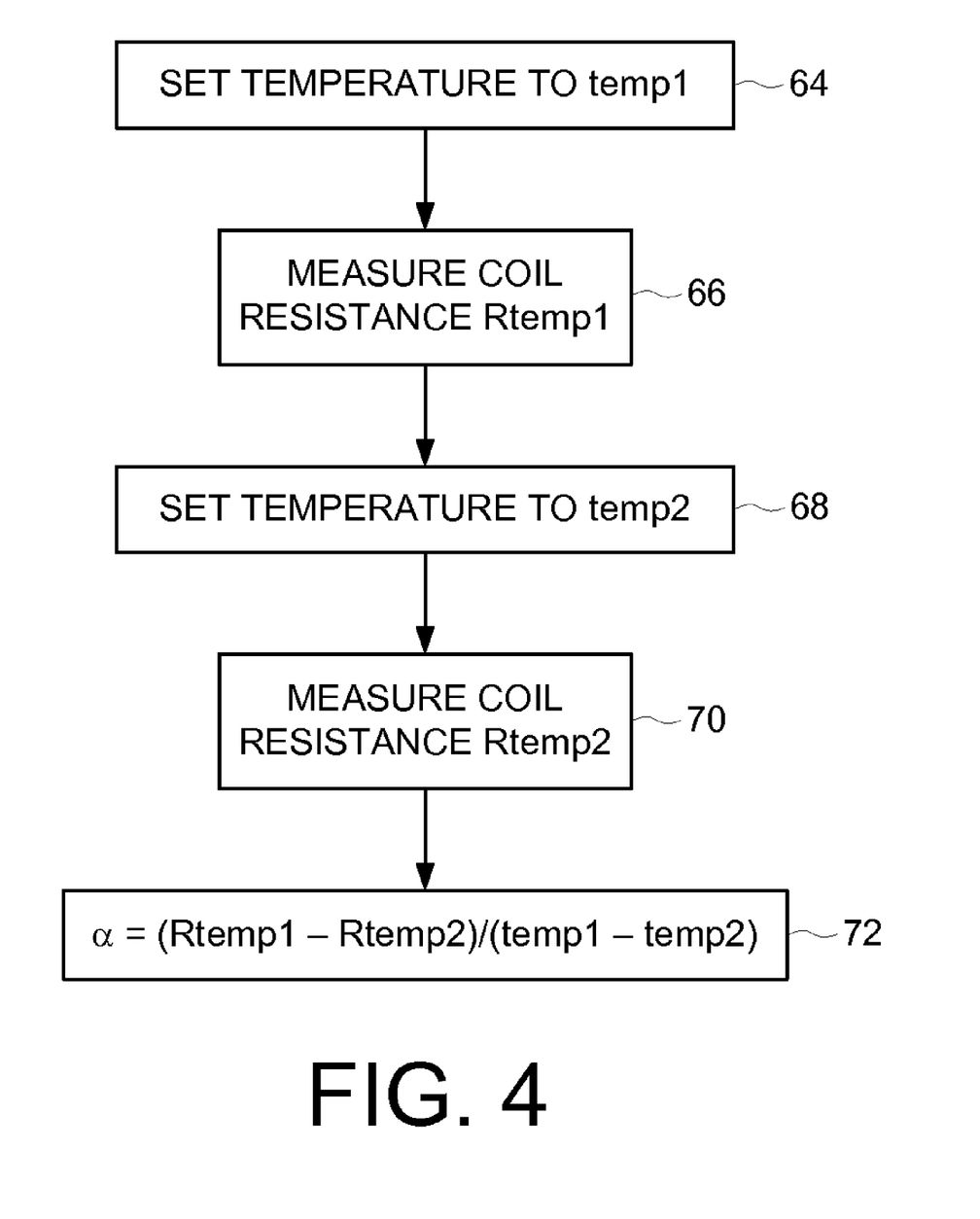
FIG. 4 is a flow diagram according to an embodiment of the present invention for calibrating a coefficient α for use in the coil temperature estimate algorithm.

The above equation includes a coefficient α which represents a temperature coefficient of resistance of the coil (e.g., approximately 3.9e-3° Celsius for copper). In one embodiment, the coefficient α is calibrated by executing the flow diagram of FIG. 4 which may be executed for each disk drive, or once for a group of disk drives employing coils of similar characteristics, such as a coil provided by a particular vendor. The disk drive is placed in a temperature controlled chamber and the temperature is set to a first temperature temp1 (step 64). After allowing the temperature to settle to temp1, a corresponding coil resistance Rtemp1 is measured (step 66). The temperature is then changed to a second temperature temp2 (step 68), and after allowing the temperature to settle, a corresponding coil resistance Rtemp2 is measured (step 70). The temperature coefficient of resistance α is then calibrated (step 72) in response to the two temperature settings (temp1 and temp2) and the two coil resistances (Rtemp1 and Rtemp2) according to:

$$\frac{Rtemp1 - Rtemp2}{temp1 - temp2}$$

Any suitable two temperature settings may be employed as long as they are sufficiently different to provide an accurate estimate of the coefficient α.

Figure 5:
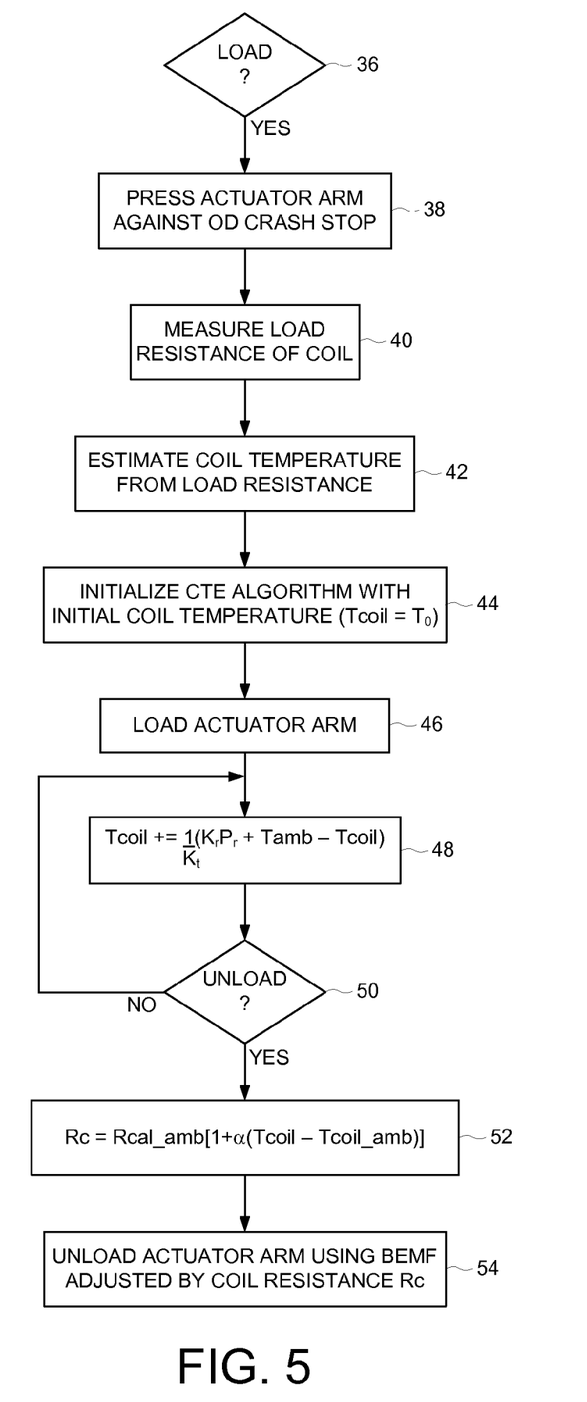
FIG. 5 is a flow diagram according to an embodiment of the present invention including an algorithm for updating the coil temperature estimate and an algorithm for converting the coil temperature estimate into an estimated coil resistance prior to executing an unload operation.

Any suitable CTE algorithm may be employed in the embodiments of the present invention. FIG. 5 is a flow diagram executed by the control circuitry 10 according to an embodiment of the present invention wherein a particular CTE algorithm is disclosed (step 48) for estimating a change in the coil temperature according to:

$$\frac{1}{K_t}(K_r P_r + Tamb - Tcoil)$$

In the above equation, Tamb is the current ambient temperature as measured using a suitable temperature sensor, and Tcoil is the previous coil temperature estimate. The coefficient Kt in the above equation is a suitable thermal time constant of the coil, and Kr is a suitable coefficient of thermal resistance. The variable Pr represents the heating power applied to the coil, and in one embodiment the heating power is estimated according to:

$$R_c I_c^2$$

where $R_c$ is an estimated resistance of the coil, and $I_c$ is a measured current flowing through the coil.

In one embodiment, the resistance of the coil Rc is estimated for use in the above equation, as well as prior to executing an unload operation to provide a more accurate estimate of the BEMF voltage by canceling the voltage due to the resistance of the coil Rc from the measured voice coil voltage. Referring again to FIG. 5, the current coil resistance is estimated (step 52) according to:

Rcal_amb[1+α(Tcoil−Tcal_amb)]

In the above equation, the coefficient α represents the temperature coefficient of resistance of the coil (as described above), and Tcoil is the estimated coil temperature prior to performing the unload operation.

Estimating the coil resistance in response to the estimated coil temperature avoids having to execute a calibration procedure (e.g., by pressing the actuator arm against a crash stop) to estimate the coil resistance prior to executing an unload operation. In addition, initializing the coil temperature estimate in response to a measured coil resistance prior to executing a load operation helps ensure the coil temperature estimate is accurate immediately following the load operation. Improving the accuracy of the CTE algorithm also improves the accuracy of the coil resistance estimate and thereby the reliability of the unload operation.

Any suitable control circuitry 10 may be employed in the embodiments of the present invention, such as any suitable integrated circuit or circuits. For example, the control circuitry 10 may be implemented within a read channel integrated circuit, or in a component separate from the read channel, such as a disk controller, on certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry 10 comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk 2 and read into a volatile semiconductor memory when the disk drive is powered on. In yet another embodiment, the control circuitry 10 comprises suitable logic circuitry, such as state machine circuitry.

What is claimed is:

1. A disk drive comprising:
a disk;
a head coupled to a distal end of an actuator arm;
a voice coil motor (VCM) operable to rotate the actuator arm about a pivot to actuate the head radially over the disk, the VCM comprising a coil;
a ramp; and
control circuitry operable to:
measure a load resistance of the coil prior to executing a load operation, wherein the load operation moves the actuator arm off the ramp to load the head onto the disk;
measure a calibrated ambient temperature (Tcal_amb) using a temperature sensor;
measure a calibrated ambient resistance (Rcal_amb) of the coil at the calibrated ambient temperature (Tcal_amb); and
convert the load resistance of the coil into an initial coil temperature estimate according to:

$$\frac{1}{\alpha}(Rcoil - Rcal\_amb) + Tcal\_amb$$

where:
α is a coefficient; and
Rcoil is the load resistance of the coil.
2. The disk drive as recited in claim 1, wherein the control circuitry measures the calibrated ambient resistance (Rcal_amb) of the coil after the VCM has been idle for a predetermined interval.

3. The disk drive as recited in claim 1, wherein the control circuitry is further operable to calibrate the coefficient α according to:

$$\frac{Rtemp1 - Rtemp2}{temp1 - temp2}$$

where:
temp1 is a first ambient temperature;
temp2 is a second ambient temperature;
Rtemp1 is a measured coil resistance at temp1; and
Rtemp2 is a measured coil resistance at temp2.

4. The disk drive as recited in claim 1, wherein the control circuitry is further operable to estimate a change in the coil temperature according to:

$$\frac{1}{K_t}(K_r P_r + Tamb - Tcoil)$$

where:
$K_t$ and $K_r$ are coefficients;
$P_r$ is a heating power of the coil;
Tamb is an ambient temperature measured with a temperature sensor; and
Tcoil is a previous coil temperature estimate.

5. The disk drive as recited in claim 4, wherein the heating power of the coil Pr is estimated according to:

$$R_c I_c^2$$

where:
$R_c$ is an estimated resistance of the coil; and
$I_c$ is a measured current flowing through the coil.

6. The disk drive as recited in claim 5, wherein the resistance of the coil $R_c$ is estimated according to:

Rcal_amb[1+α(Tcoil−Tcal_amb)].

7. The disk drive as recited in claim 4, wherein the control circuitry is further operable to convert the coil temperature estimate into an unload resistance of the coil prior to executing an unload operation.

8. The disk drive as recited in claim 7, wherein the control circuitry is further operable to convert the coil temperature estimate into the unload resistance of the coil according to:

Rcal_amb[1+α(Tcoil−Tcal_amb)].

9. A method of operating a disk drive, the disk drive comprising a disk, a head coupled to a distal end of an actuator arm, a voice coil motor (VCM) operable to rotate the actuator arm about a pivot to actuate the head radially over the disk, the VCM comprising a coil, and a ramp, the method comprising:
measuring a load resistance of the coil prior to executing a load operation, wherein the load operation moves the actuator arm off the ramp to load the head onto the disk;
measuring a calibrated ambient temperature (Tcal_amb) using a temperature sensor;
measuring a calibrated ambient resistance (Rcal_amb) of the coil at the calibrated ambient temperature (Tcal_amb); and
converting the load resistance of the coil into an initial coil temperature estimate according to:

$$\frac{1}{\alpha}(Rcoil - Rcal\_amb) + Tcal\_amb$$

where:
α is a coefficient; and
Rcoil is the load resistance of the coil.

10. The method as recited in claim 9, wherein measuring the calibrated ambient resistance (Rcal_amb) of the coil is performed after the VCM has been idle for a predetermined interval.

11. The method as recited in claim 9, further comprising calibrating the coefficient α according to:

$$\frac{Rtemp1 - Rtemp2}{temp1 - temp2}$$

where:
temp1 is a first ambient temperature;
temp2 is a second ambient temperature;
Rtemp1 is a measured coil resistance at temp1; and
Rtemp2 is a measured coil resistance at temp2.

12. The method as recited in claim 9, further comprising estimating a change in the coil temperature according to:

$$\frac{1}{K_t}(K_r P_r + Tamb - Tcoil)$$

where:
$K_t$ and $K_r$ are coefficients;
$P_r$ is a heating power of the coil;
Tamb is an ambient temperature measured with a temperature sensor; and
Tcoil is a previous coil temperature estimate.

13. The method as recited in claim 12, wherein the heating power of the coil Pr is estimated according to:

$$R_c I_c^2$$

where:
$R_c$ is an estimated resistance of the coil; and
$I_c$ is a measured current flowing through the coil.

14. The method as recited in claim 13, wherein the resistance of the coil $R_c$ is estimated according to:

Rcal_amb[1+α(Tcoil−Tcal_amb)].

15. The method as recited in claim 12, further comprising converting the coil temperature estimate into an unload resistance of the coil prior to executing an unload operation.

16. The method as recited in claim 15, wherein the coil temperature estimate is converted into the unload resistance of the coil according to:

Rcal_amb[1+α(Tcoil−Tcal_amb)].

17. A disk drive comprising:
a disk;
a head coupled to a distal end of an actuator arm;
a voice coil motor (VCM) operable to rotate the actuator arm about a pivot to actuate the head radially over the disk, the VCM comprising a coil;
a ramp;

a means for measuring a load resistance of the coil prior to executing a load operation, wherein the load operation moves the actuator arm off the ramp to load the head onto the disk;

a means for measuring a calibrated ambient temperature (Tcal_amb) using a temperature sensor;

a means for measuring a calibrated ambient resistance (Rcal_amb) of the coil at the calibrated ambient temperature (Tcal_amb); and a means for converting the load resistance of the coil into an initial coil temperature estimate according to:

$$\frac{1}{\alpha}(Rcoil - Rcal\_amb) + Tcal\_amb$$

where:

α is a coefficient; and

Rcoil is the load resistance of the coil.

18. A disk drive comprising:

a disk;

a head coupled to a distal end of an actuator arm;

a voice coil motor (VCM) operable to rotate the actuator arm about a pivot to actuate the head radially over the disk, the VCM comprising a coil;

a ramp; and control circuitry operable to:

measure a load resistance of the coil prior to executing a load operation, wherein the load operation moves the actuator arm off the ramp to load the head onto the disk;

convert the load resistance of the coil into an initial coil temperature estimate;

update the coil temperature estimate after the load operation; and convert the updated coil temperature estimate into an unload resistance of the coil prior to executing an unload operation, wherein the unload operation moves the actuator arm onto the ramp.

19. A method of operating a disk drive, the disk drive comprising a disk, a head coupled to a distal end of an actuator arm, a voice coil motor (VCM) operable to rotate the actuator arm about a pivot to actuate the head radially over the disk, the VCM comprising a coil, and a ramp, the method comprising:

measuring a load resistance of the coil prior to executing a load operation, wherein the load operation moves the actuator arm off the ramp to load the head onto the disk;

converting the load resistance of the coil into an initial coil temperature estimate;

updating the coil temperature estimate after the load operation; and converting the updated coil temperature estimate into an unload resistance of the coil prior to executing an unload operation, wherein the unload operation moves the actuator arm onto the ramp.

* * * * *